US008626537B2

(12) United States Patent
Lally

(10) Patent No.: US 8,626,537 B2
(45) Date of Patent: Jan. 7, 2014

(54) SYSTEM AND METHOD FOR A COMBINATION GROUP AND INDIVIDUAL TRAVEL INSURANCE PROGRAM

(76) Inventor: Fiona Francesca Lally, New Lebanon, NY (US)

( * ) Notice: Subject to any disclaimer, the term of this patent is extended or adjusted under 35 U.S.C. 154(b) by 103 days.

(21) Appl. No.: 13/335,274

(22) Filed: Dec. 22, 2011

(65) Prior Publication Data

US 2013/0166324 A1 Jun. 27, 2013

(51) Int. Cl.
*G06Q 40/00* (2012.01)

(52) U.S. Cl.
USPC .......... 705/4

(58) Field of Classification Search
USPC .......... 705/4
See application file for complete search history.

(56) References Cited

U.S. PATENT DOCUMENTS

| | | | |
|---|---|---|---|
| 4,203,620 | A | 5/1980 | Long |
| 4,975,840 | A | 12/1990 | DeTore et al. |
| 6,014,632 | A | 1/2000 | Gamble et al. |
| 6,944,536 | B2 | 9/2005 | Singleton |
| 7,124,088 | B2 | 10/2006 | Bauer et al. |
| 7,143,051 | B1 | 11/2006 | Hanby et al. |
| 7,203,734 | B2 | 4/2007 | Rudy et al. |
| 7,246,070 | B2 | 7/2007 | Schwartz et al. |
| 7,277,861 | B1 | 10/2007 | Benson et al. |
| 7,333,939 | B1 | 2/2008 | Stender et al. |
| 7,343,307 | B1 | 3/2008 | Childress |
| 7,343,310 | B1 | 3/2008 | Stender |
| 7,349,954 | B2 | 3/2008 | Cianciarulo et al. |
| 7,565,302 | B2 | 7/2009 | Best-Devereux |
| 7,720,764 | B2 | 5/2010 | Emerson et al. |
| 7,734,485 | B1 | 6/2010 | Bohanek |
| 2002/0116310 | A1 | 8/2002 | Cohen et al. |
| 2002/0128879 | A1 | 9/2002 | Spears |
| 2002/0143585 | A1 | 10/2002 | Kodama et al. |
| 2002/0143680 | A1 | 10/2002 | Walters et al. |
| 2003/0101131 | A1 | 5/2003 | Warren et al. |
| 2003/0182165 | A1 | 9/2003 | Kato et al. |
| 2004/0078246 | A1 | 4/2004 | McCaffrey et al. |
| 2004/0128171 | A1 | 7/2004 | Rees et al. |
| 2004/0143464 | A1 | 7/2004 | Houle et al. |
| 2004/0172310 | A1 | 9/2004 | Atlee et al. |
| 2004/0186750 | A1 | 9/2004 | Surbey et al. |
| 2005/0125260 | A1 | 6/2005 | Green et al. |
| 2006/0206362 | A1 | 9/2006 | Rudy et al. |
| 2006/0241982 | A1 | 10/2006 | Seifert et al. |
| 2007/0118470 | A1 * | 5/2007 | Warren et al. .......... 705/38 |
| 2007/0136109 | A1 | 6/2007 | Yager et al. |
| 2007/0244726 | A1 | 10/2007 | Jenkins |
| 2007/0282639 | A1 | 12/2007 | Leszuk et al. |
| 2007/0288272 | A1 | 12/2007 | Marks et al. |
| 2011/0029430 | A1 * | 2/2011 | Norris et al. .......... 705/39 |

* cited by examiner

*Primary Examiner* — Jessica Lemieux
(74) *Attorney, Agent, or Firm* — Nancy Baum Delain

(57) ABSTRACT

The present invention allows travel organizations to ensure that basic group, or "Core," travel medical coverage is in effect for their travelers while allowing travelers the ability to upgrade the "Core" insurance if needed or desired. Thus, the organization need not purchase excess insurance, thereby reducing the organization's liability for their group purchase decision. Until now, combining group and individual travel medical insurance has been impossible. Individual travel medical insurance policies could be customized, but travelers covered by a group policy had to accept the coverage their organizations chose. The present invention allows travelers with different needs and tastes from around the world to customize group travel insurance coverage according to their needs and desires. By offering choice, the present invention reduces the likelihood that travelers can successfully claim later that insurance required under the group program was inadequate.

14 Claims, 8 Drawing Sheets

SYSTEM AND METHOD FOR A COMBINATION GROUP AND INDIVIDUAL TRAVEL INSURANCE PROGRAM

CROSS-REFERENCE TO RELATED APPLICATIONS

This Application is based upon but does not claim the benefit of Provisional Application No. 61/110,982, filed in the US Patent and Trademark Office on 3 Jun. 2008.

BACKGROUND OF THE INVENTION

1. Field of the Invention

The present invention relates to a system and method of allowing travelers 150 who are traveling with a group such as an international organization, including but not limited to international volunteers with charitable organizations and international travelers 150 associated with a commercial traveling group, to combine group and individual travel insurance.

2. Description of Related Art

Today's group travel sponsoring organizations and individual travelers 150 are more concerned than ever about personal safety and security. Not only is physical safety more in question when traveling than it has ever been, the safety and proper delivery of a traveler's items is also less reliable than it has been in the past. Travelers 150 can need help in getting out of situations such as natural disasters or political unrest, and travelers 150 may want their insurance to link together travel programs and personal voyages. With these increasing demands for personal security and security of the traveler's belongings, traveler's insurance, especially for international travel, is now virtually required for each traveler to carry.

Persons traveling as volunteers for nonprofit or government-funded organizations may not have any life or accident insurance whatsoever, or the insurance they have in their home country may not respond well to incidents that occur outside of their home country. The volunteer may be a recent graduate from a high school, college or university, a member of a religion-based volunteer group, a member of a volunteer medical team, a corporate executive, or any other person who travels for volunteer purposes. Insureds may also be travelers 150 on educational or travel programs that do not include volunteering. The organization may be for-profit or non-profit. These travelers 150 don't usually buy travel insurance on their own, but generally rely on the travel organization to provide insurance for them.

If a traveler travels with an established group, such as a tour group, travel insurance is provided, with very favorable terms, in the cost of the tour. That level of travel insurance is generally not determined by the individual traveler. The benefit levels and terms for travel insurance are set for groups, and individuals have not been able to customize the limits or kinds of insurances they want. In general, travel insurance for individuals is not used by most travel groups because it does not provide enough benefits for risk management and cost; the organizations commonly use group coverage for volunteers and participants.

Upgrade 195 options have not been available to people insured under a group travel program in the way that they are available to individual travelers 150 who purchase individual travel insurance.

SUMMARY OF THE INVENTION

The term "risk-taker" is used herein to mean these various potential insurers and insurance mechanisms that are available to the traveler and the travel organization; this term may comprise a traditional insurance company, a self-insurance plan, or any other mechanism that accepts the risk and responsibility of payment of all or part of a client's medical expense 100 as.

The present invention provides a system and method for an individual to convert group travel insurance to an individual insurance plan while still using both. The present invention does not describe a portability plan; an individual can, under the present invention, add an individual insurance component onto a group travel insurance plan as an enhancement.

The organization that sponsors the travel purchases a basic amount of coverage for their travelers 150. Then each individual traveler is directed to a website 160 or other e-commerce means (including Web 2.0, USENET, e-mail, telephone 720, fax 705*e*, and FTP) where he or she can choose customized upgrade 195 options for him-or herself and/or family members and traveling companions such as wards or children under the program.

The present invention also provides systems and methods to design individual traveler insurance products for a traveler in a manner that provides the individual traveler with the benefits of group traveler insurance plans and rates.

The present invention allows travel organizations to ensure that basic group, or "Core," travel medical coverage is in effect for their travelers while allowing travelers the ability to upgrade the "Core" insurance if needed or desired. This means the organization does not have to buy too much insurance and the organization's liability for their group purchase decision is reduced. Until now, it has not been possible for travelers to combine group and individual travel medical insurance. Travelers buying individual travel medical insurance could customize their policies, but if the travelers were part of a group policy, they had to accept the coverage their organizations chose for them. The present invention allows travelers with different needs and tastes from around the world to customize group travel insurance coverage according to their needs and desires. By offering choice, the present invention reduces the likelihood that travelers can successfully claim later that insurance required under the group program was inadequate.

BRIEF DESCRIPTION OF THE INVENTION

Figure 1:
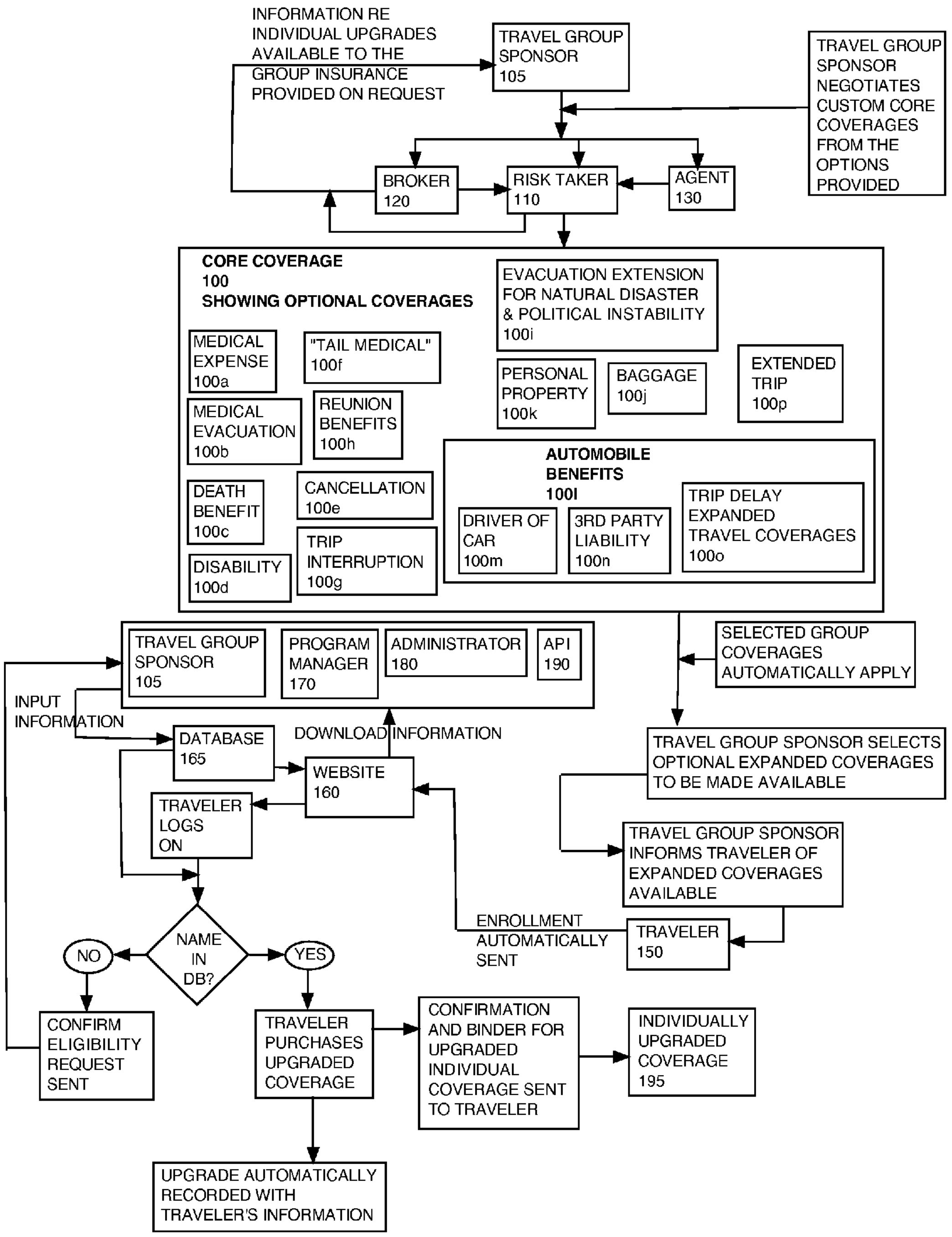
Referring now to FIG. 1, the workflow of the CORE process is shown as a flow diagram. Each major step in the process is noted.

Referring now to FIG. 1, a group sponsor 105 arranges group insurance coverage (referred to herein as "Core Coverage") with a risk taker 110 that provides travel medical insurance or insurance of a similar nature through an insurance broker 120 or through the risk taker 110 directly. It is also within the scope of the invention for the Core Coverage 100 plan to be a self-insurance plan or a high-retention or captive plan.

Figure 2:
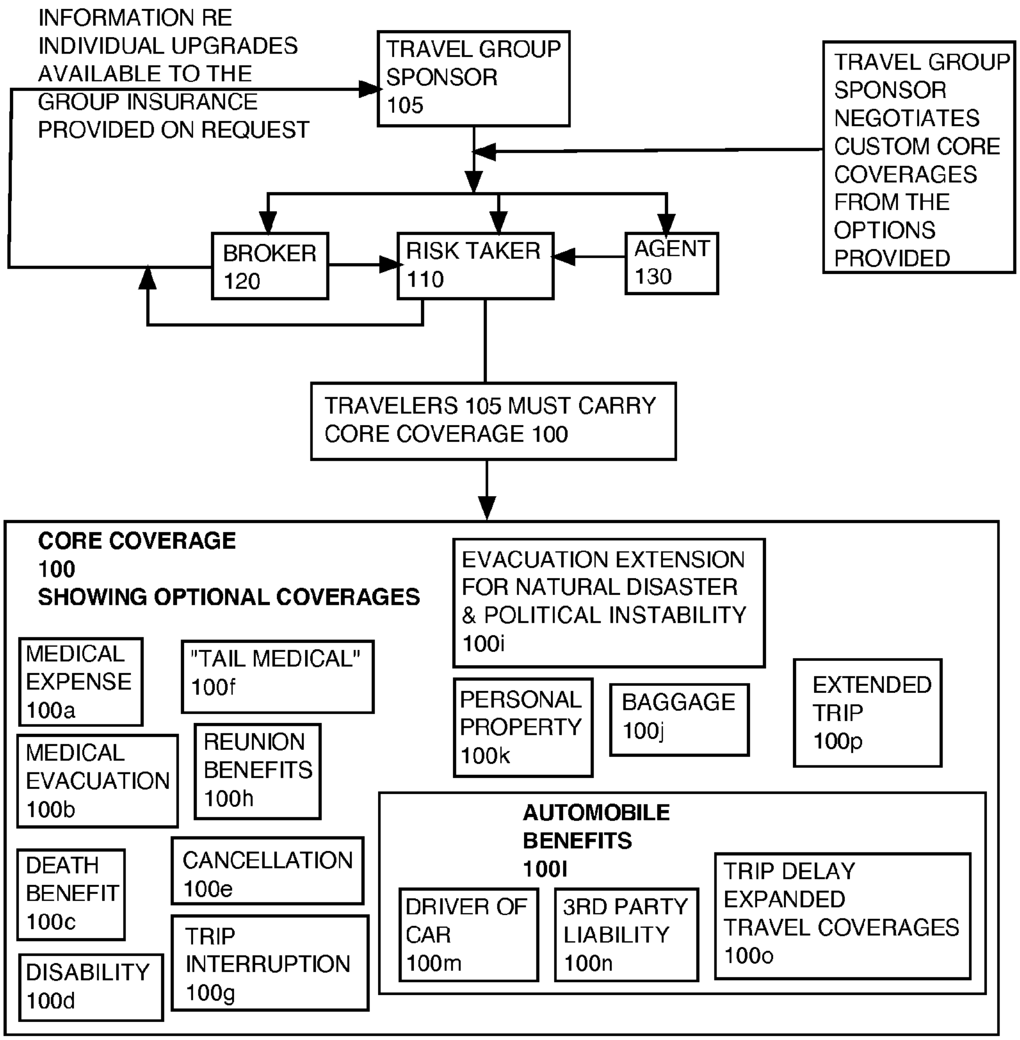
Referring now to FIG. 2, the workflow of obtaining CORE coverage is shown. Each optional coverage that is currently available is listed.
Figure 3:
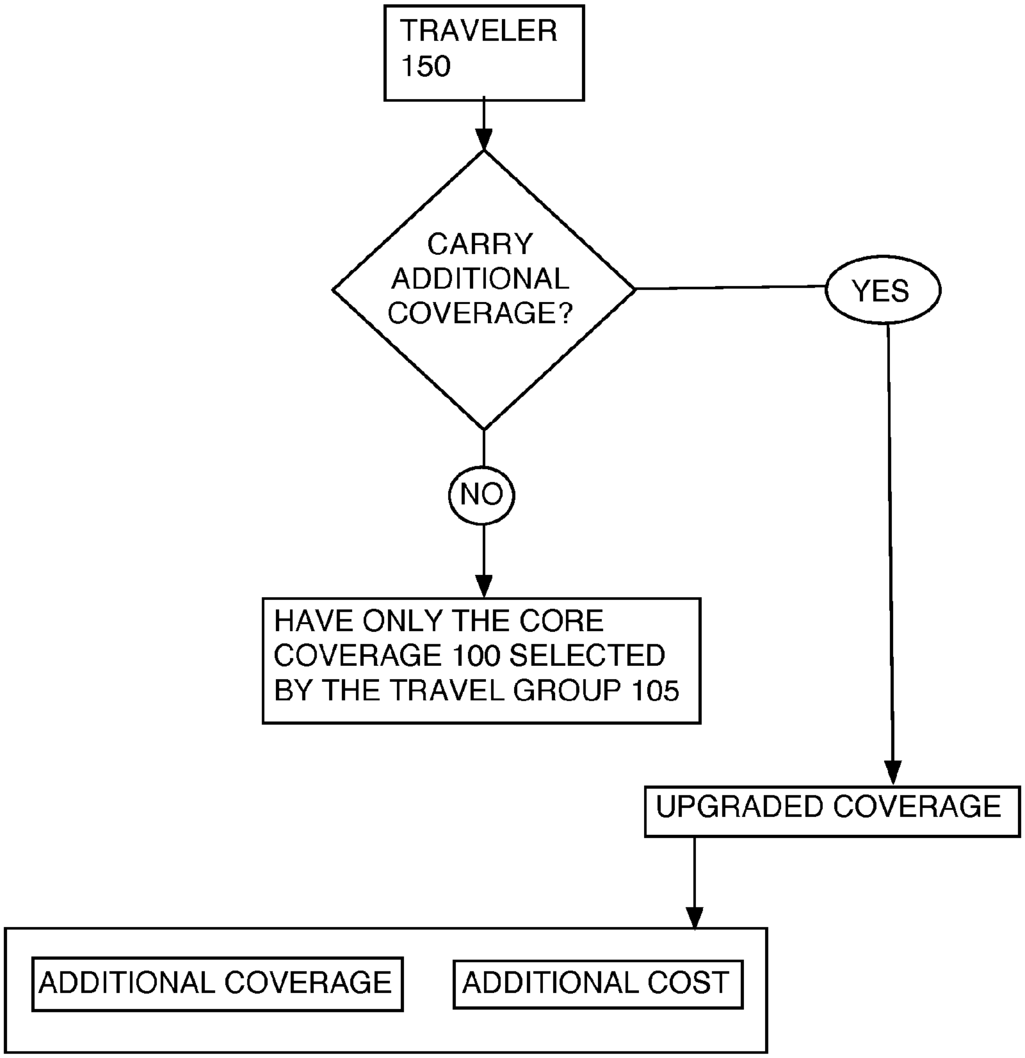
Referring now to FIG. 3, the workflow of the traveler's choice whether or not to carry additional coverage is shown.

Referring now to FIG. 2, the group sponsor 105 purchases a basic, or "Core," coverage that all persons traveling 150 with the group must carry;

Referring now to FIG. 3, the individual traveler 150 has the choice to upgrade 195 his or her insurance package or to carry only the "Core" coverage 100.

Figure 4:
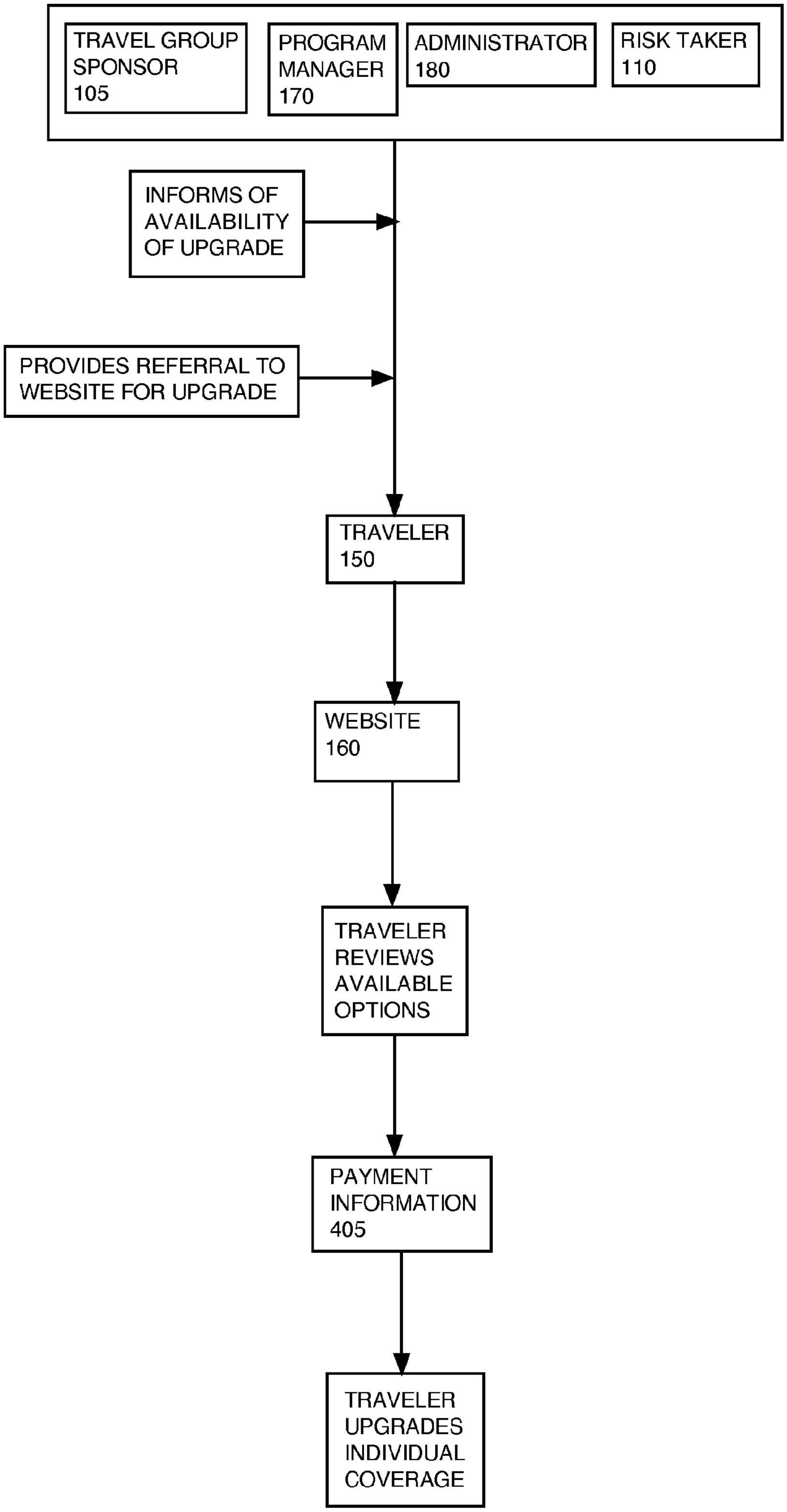
Referring now to FIG. 4, the workflow of the traveler obtaining additional coverage is shown.

Referring now to FIG. 4, the risk taker 110, the insurance carrier, or the organization 105 or the Core program 100 manager 170 or administrator 180 relays the availability of the individual choice option to the individual travelers 150 and refers them to a website 160 designed for adding individual upgrades 195 to the "Core" insurance 100 purchased by the organization 105. The term "administrator" 180 or "program manager" 170 may refer to service provided by the risk taker 110. The term "website" 160 may refer to a social networking or e-commerce website. The website 160 is, in the current embodiment, provided by the Core Travel Program manager 170; however, it is within the scope of the invention for the upgrade website 160 or other e-commerce means to be provided by the international travel organization 105 or broker 120. In that embodiment, the international travel organization or broker 120 would collect the data regarding individual upgrades 195 and payment information 405 and forward that information 195, 405 to the insurance carrier or broker 120. In an alternate embodiment, the upgrade website 160 or other e-commerce means may be provided by the risk-taker 110.

Figure 5:
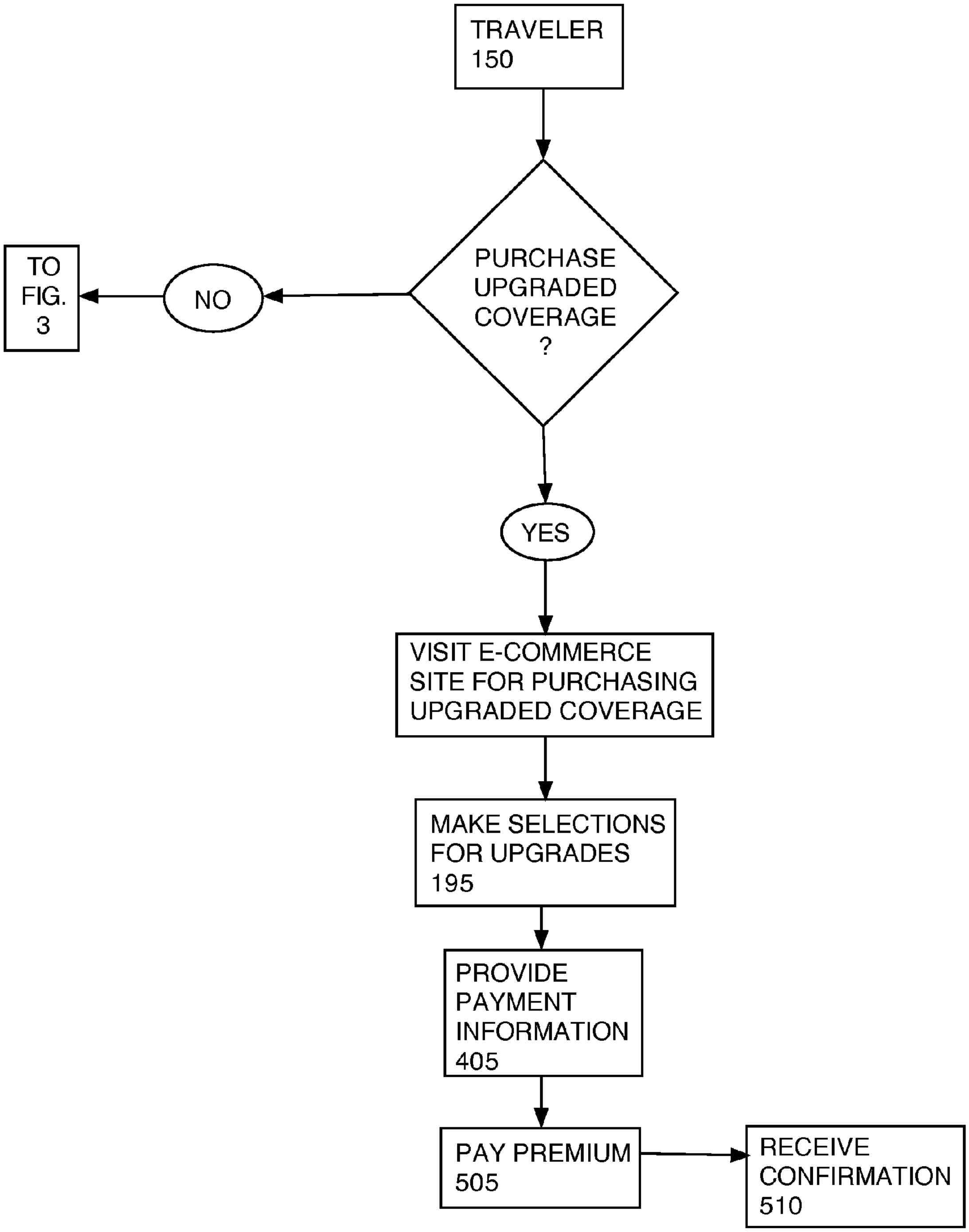
Referring now to FIG. 5, the workflow of the traveler paying for additional coverage is shown.

Referring now to FIG. 5, those travelers 150 who choose to do so can make upgrade purchases 195 directly on the website 160 or through other e-commerce means and receive a confirmation of upgrade 510 coverage from the website 160 or from the administrator 180 or Core program manager 170 or risk taker 110.

Figure 6:
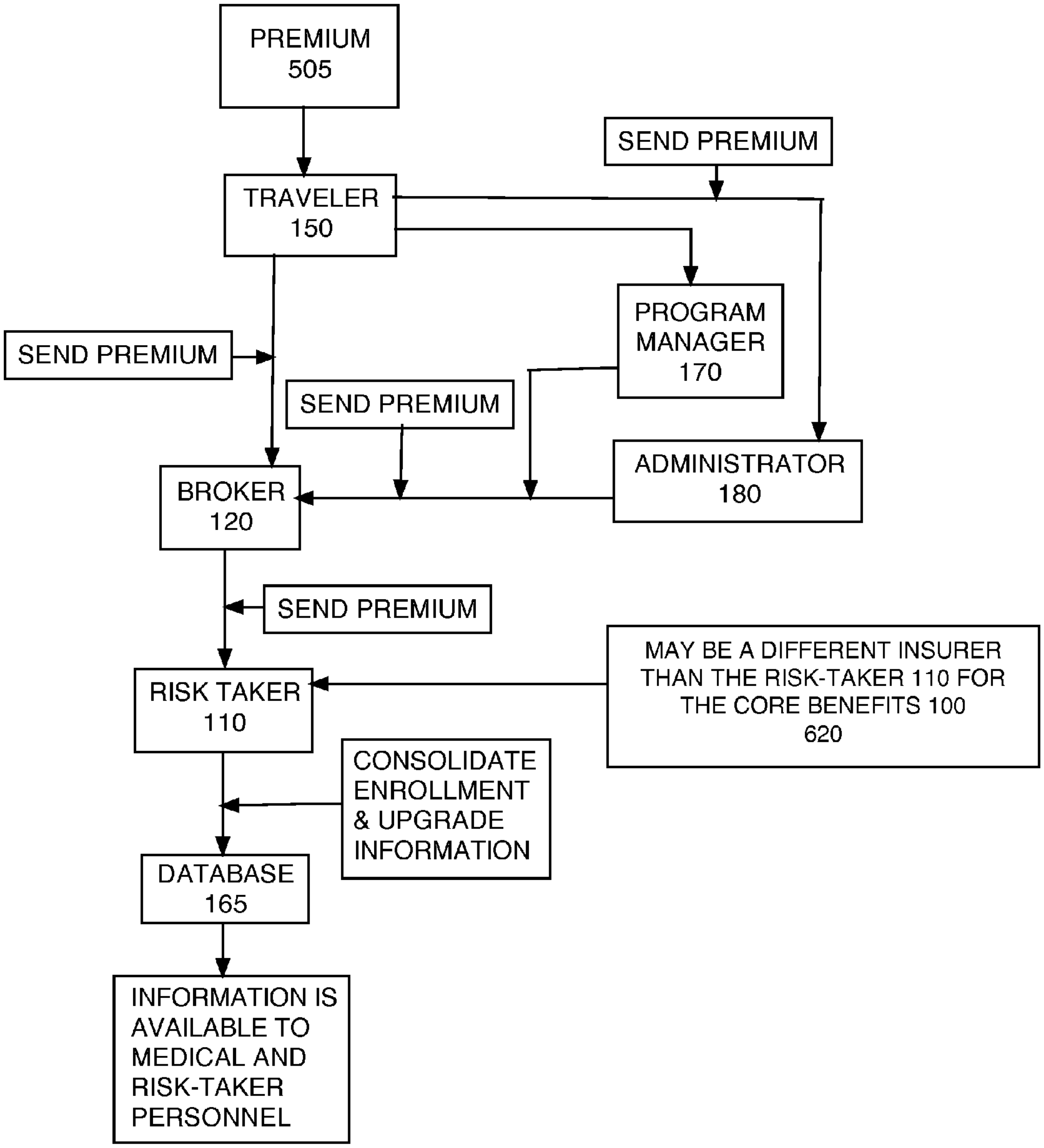
Referring now to FIG. 6, the workflow of premium processing for additional coverage and of making the traveler's information available through a database to medical and risk-taker personnel is shown.

Referring now to FIG. 6, the premiums 610 for individual upgrades 195 are sent to the same risk taker 110 who provides the Core policy 100 to the group, and who upgrades 195 that individual's 150 insurance package 100 based on his or her choices for upgrades 195. The website 160 or other e-commerce means may provide a commercially available mechanism that allows the traveler 150 to pay 405 for the additional coverage 195 online; alternatively, the traveler 150 may choose to pay the premiums 610 for coverage by mailing payment to the international travel organization 105 or to the risk taker 110 or the broker 120, either of which may be the designated payee for the purpose of purchasing additional coverage 195. Upgrades 195 occur before premiums 610 are sent; they do not occur, however, until after purchases 195 are confirmed.

Figure 7:
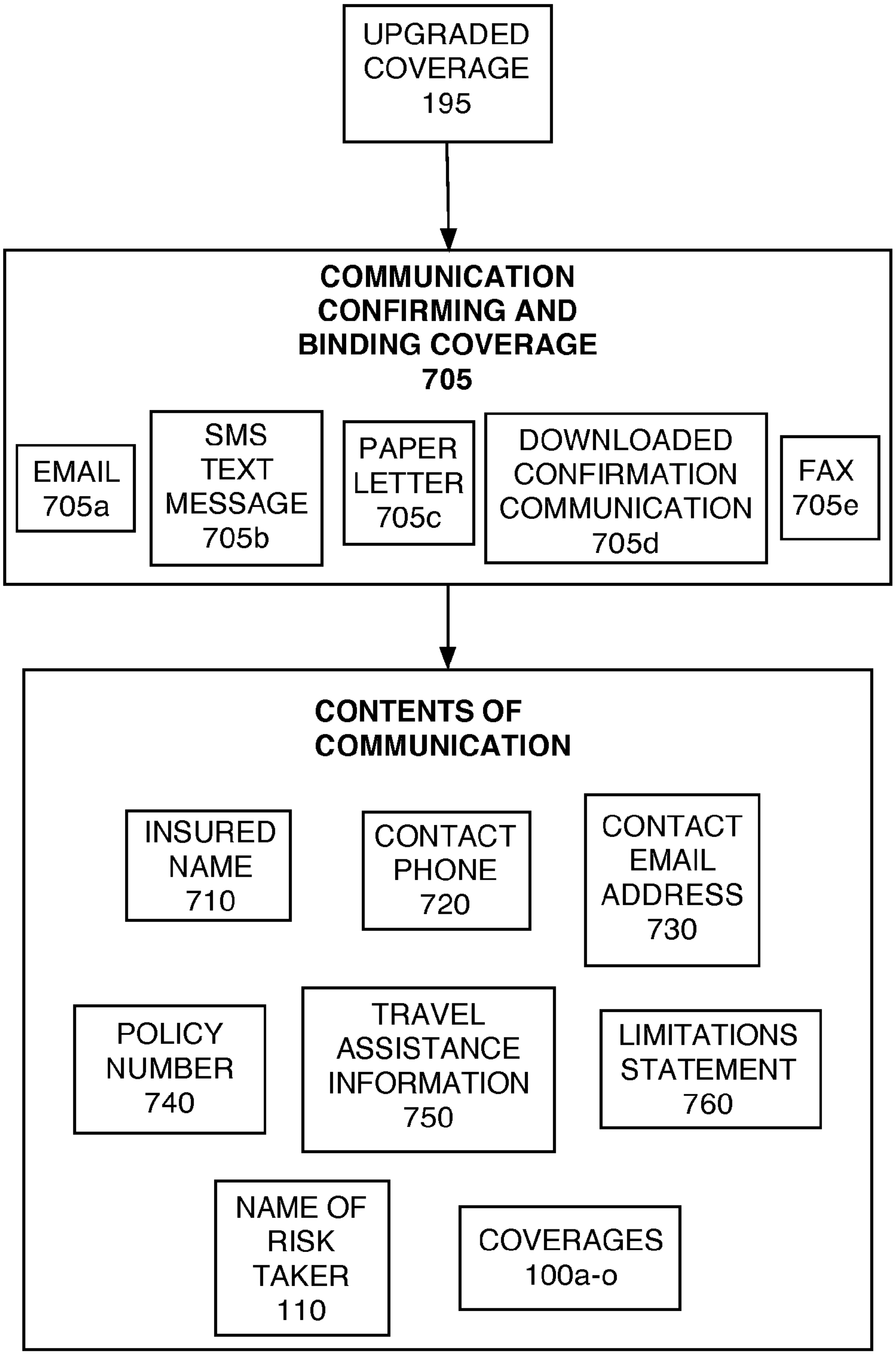
Referring now to FIG. 7, the workflow of communicating confirming information regarding upgraded coverage and the contents of the confirming communication are shown.

Referring now to FIG. 7, the individual traveler receives a communication 705 from the risk taker 110, the risk taker 110's computer system, the travel group 105, or the administrator 180 confirming and binding the coverage. The binding communication 705 contains the name of the insured person 710, the coverages 100*a-p* extended, improved or added, a contact telephone number 720 and email address 730, the name of the risk taker 110, travel assistance information 750, the policy number 740, and a limitations statement 760.

Figure 8:
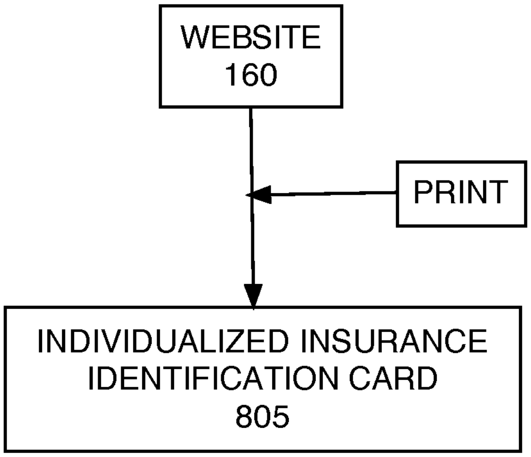
Referring now to FIG. 8, the workflow of obtaining an individualized insurance identification card is shown.

Referring now to FIG. 8, the individual traveler may choose to print out an insurance identification card 805 from the Core travel insurance website 160. In the alternative, the sponsoring travel organization 105 may choose to control the identification card 805 process by printing and distributing the cards.

DETAILED DESCRIPTION OF THE INVENTION

Referring now to FIG. 1, a travel group sponsor 105 arranges "Core Coverage" 100 with a travel risk taker 110 through a broker 120 or agent 130 or through the risk taker 110 directly.

The risk taker 110 is not a party to this invention and the choice of insurance carrier is interchangeable.

International travel organizations 105 may serve as travel group sponsors 105 and purchase "Core" insurance coverage 100 for travelers 150 planning to travel on programs that may include educational or volunteer programs sponsored by the travel group sponsor 105. The "Core" coverage 100 is generally an assortment of benefits that may include medical expense 100*a*, medical evacuation 100*b*, death benefit 100*c*, disability 100*d*, cancellation 100*e*, "tail medical" 100*f*, trip interruption 100*g*, and/or reunion benefits 100*h*. In addition, there can be evacuation extension for natural disaster and political instability 100*i*, for which the participant need not experience accident or illness for the benefit to apply. In addition, baggage 100*j*, personal property 100*k* and, automobile-related 1001 benefits may be included, including collision and personal injury insurance. Specifically, automobile-related 1001 "Core" coverage 100 may also include coverage for being the driver of an automobile 100*m*, coverage for third-party liability 100*n*, or trip delay and expanded travel coverages 100*o*. The plan type may be a self-insurance plan, a high-retention plan, or a captive plan. Coverage can be provided for individual travelers, the individual traveler's family members, and the individual traveler's traveling companions (the traveler's children and the traveler's wards).

The "Core" benefits 100 apply automatically to each traveler 150. The assortment is not fixed and is negotiated with the broker 120 and/or the risk-taker 110 for each sponsoring group 105. The enrollment is sent to a website 160 for download by the organization 105, the program manager 170, the administrator 180, or by use of an Application Programming Interface ("API") 190.

The broker 120 or "Core" program manager 170 provides the travel group sponsor 105 with information about how travelers 150 can upgrade their individual benefits 195 on the website 160, and the organization 105 chooses the upgrade assortment 195 it wishes to allow travelers 150 to access. Travelers 150 can optionally extend the dates covered by the existing coverage 100, improve the limits of the existing coverage 100, and/or add new coverage 195. New coverage 195 comprises any travel- and/or medical-related coverage that is offered by the risk taker 110 and the sponsoring organization 105, but is not included by the sponsoring organization 105 in the "Core" coverage 100.

The organization 105 tells their travelers 150 of the upgrade option 195 using any available means of communication including print, telephonic, and/or electronic, and refers the travelers 150 to the website 160 or other e-commerce means provided by the program manager 170. In an alternate embodiment, the website 160 or other e-commerce solution may be provided by the risk-taker 110. In yet an alternate embodiment, the website 160 or other e-commerce means may be provided by the sponsoring organization 105 or broker 120 for the purpose of allowing the traveler 150 to upgrade 195 Core insurance coverage 100.

Travelers 150 can optionally make upgrade 195 purchases directly on the website 160 or alternate e-commerce means, and receive a confirmation 705 of upgraded coverage 195. The upgrade 195 is automatically recorded on the traveler's 150 enrollment information, usually in a database 165. The database 165 minimally contains the following information:

- an individual traveler's 150 name;
- the traveler's 150 permanent address;
- the traveler's 150 address while traveling;
- the traveler's upgrade coverage 195 options, which include but are not limited to:
  - upgraded medical coverage 100*a*, 100*b*, 100*f,*
  - death benefit 100*c,*
  - disability coverage 100*d,*
  - lost baggage coverage 100*j,*
  - extended-trip coverage 100*p,*
  - automobile coverage 100*l*, including:
    - coverage for being the driver of an automobile 100*m,*
    - third-party liability coverage 100*n*
  - trip delay and expanded travel coverages 100*o*, and
  - upgraded trip cancellation coverage 100*e;*
- the traveler's upgrade coverage price;
- the traveler's credit card or other payment information;
- the traveler's destination;
- the traveler's country of origin; and
- the traveler's travel dates.

The upgrade 195 is independent of the travel organization 105 and upgrades 195 play no role in the travel group 105 administration. At times when the newly insured traveler's 150 name is not in the database 165, the organization 105 can be asked to confirm that insured's 150 eligibility for coverage, either to a requestor or by downloading the traveler's 150 information.

In the present embodiment, the same risk taker 110 that provides the Core coverage 100 provides the upgrade benefits 195; it is, however, within the scope of the invention for a risk-taker 620 that does not provide the Core coverage 100 to provide the upgrade benefits 195.

The upgrade 195 process can also be accomplished through the use of a paper-based or telephone-based system. The upgrade 195 can be done manually by the Core travel administrator 180 or program manager 170 or by a representative of the risk-taker 110 or broker 120. The individual traveler 150 contacts the travel company 105 or the program manager 170, administrator 180, and/or risk taker 110 directly or indirectly to obtain the forms to fill out to select the upgraded coverages 100*a-p* desired. The traveler 150 then fills out the forms and mails, emails or faxes them to an address, an email address , or a fax number provided by the carrier 110, 620 or the travel company 105, along with payment 505 in cash, check, money order, credit card or other means of payment. Requests can also be processed over the phone directly with the Core travel administrator 180 or program manager 170. While payment 505 is at this time made in US dollars, the currency used for payment is irrelevant to this invention and can be in any currency. Likewise, the language currently in use by the system is English, but it is within the scope of the invention to use any language that can be represented in writing.

Referring now to FIG. 2, the group sponsor 105 purchases a basic, or "Core," coverage 100 that all persons 150 traveling with the group must carry.

Referring now to FIG. 3, the individual traveler 150 has the choice to upgrade 195 his or her insurance package or to carry only the "Core" coverage 100;

Referring now to FIG. 4, the risk taker 110, the organization 105, or the Core program 100 manager 170 or administrator 180 relays the availability of the individual choice option to the individual travelers 150 and refers them to a website 160 designed for adding individual upgrades 195 to the "Core" insurance 100 purchased by the organization 105. The term "administrator" 180 or "program manager" 170 may refer to service provided by the risk taker 110. The term "website" 160 may refer to a social networking or e-commerce website 160. The website 160 is, in the current embodiment, provided by the program manager 170; however, it is within the scope of the invention for the upgrade website 160 or other e-commerce means to be provided by the international travel organization 105 or broker 120. In that embodiment, the international travel organization 105 or broker 120 would collect the data regarding individual upgrades 195 and payment information 405 and forward that information 195, 405 to the risk taker 110 or broker 120. In an alternate embodiment, the upgrade website 160 or other e-commerce means may be provided by the risk-taker 110.

Referring now to FIG. 5, those travelers 150 who choose to do so can make upgrade 195 purchases directly on the website 160 or through other e-commerce means and receive a confirmation 705 of upgrade 195 coverage from the website 160 or from the administrator 180 or program manager 170 or risk taker 110.

Referring now to FIG. 6, the premiums 610 for individual upgrades 195 are sent by the individual traveler 150 or, in an alternate embodiment, by the group sponsor organization 105, to the broker 120, program manager 170, or program administrator 180 for the travel group. If the premiums 610 are sent to the travel group sponsor 105, the travel group sponsor 105 forwards the premiums 610 to the broker 120 or program manager 170, who then sends the premiums 610 to the risk taker 110. It is also within the scope of the invention that the travel group sponsor 105 forwards the premiums 610 directly to the risk-taker 110, 620. Enrollment and upgrade information 705 is consolidated for the traveler 150 on the website's 160 database 165 or any data-collecting system that may be connected to the website 160, so that the information 705 is easily available to a medical assistance provider in the event of a medical need while the traveler 150 is overseas. The risk taker 110 and/or claims administrator 180 can also find information about enrollments under Core 100 and upgraded benefits 195 on the website 160. In addition, the medical assistance provider is given specific information on the management and treatment of Core 100 travelers 150 that reflects their special needs as international educational or volunteering group 105 clients.

It is within the scope of the invention that an insurer 620 other than the Core coverage 100 risk taker 110 may provide individual upgrades 195. In this embodiment, the individual traveler 150 or the sponsoring organization 105 sends the premiums 610 for individual upgrade 195 to the broker 120 or program manager 170, who sends the premiums 610 to the insurer 620 providing the upgraded coverage 195. In an alternate embodiment, the individual 150 may send the upgrade information 195 directly to the risk-taker 620, eliminating the broker 120 or program manager 170 from the upgrade 195 process. The upgraded coverage 195 is reflected on the website 160 or other e-commerce means.

Referring now to FIG. 7, once the traveler 150 has upgraded 195 his or her Core coverage 100, the traveler 150 receives communication 705 from the system confirming and binding the coverage 100*a-p*. The communication 705 contains the name of the insured person 150, the coverages 100*a-p* extended, improved, or added, a contact telephone number 720 and email address 730, the name of the risk taker 110, the policy number 740, travel assistance information 750, and a limitations statement 760.

It is within the scope of the invention for the system or an employee or agent 130 of the risk taker 110 to confirm and bind coverage 705 using an email 705a, a SMS text message 705*b*, a paper letter 705*c*, a downloaded confirmation communication 705*d*, or a fax 705*e* to the traveler 150 who has upgraded 195 his or her Core overage 100. The communication 705 contains the name of insured person 150, the coverages 100*a-p* extended, improved, or added, a contact telephone number 720 and email address 730, the name of the risk taker 110, the policy number 740, travel assistance information 750, and a limitations statement 760.

Referring now to FIG. 8, participants can print individualized insurance Identification cards 805 from their organization's customized website 160. The Identification card 805 contains the relevant information about the participant 150 that reflects information pulled from the Core Travel database 165.

It is also within the scope of the invention for an individualized insurance Identification card 805 to be printed and distributed to the traveler 150 by the risk taker 110 or by the travel group 105.

It is within the scope of the invention that, rather than an email 705*a*, the traveler is sent a hard-copy confirmation letter 705*c* that binds the coverage. The traveler 150 receives a letter 705*c* sent from the insurer that confirms and binds coverage. The letter 705*c* contains the name of the insured person 150, the coverages 100*a-p* extended, improved, or added, a contact telephone number 720 and email address 730, the name of the risk taker 110, the policy number 740, travel assistance information 750, and a limitations statement 760.

It is a benefit of this invention that it could be licensed to insurance companies or brokers. This invention is particularly useful to organizations that have insured travelers originating from all around the world and traveling worldwide. Often these travelers do not pass through the United States and thus need access to an international venue for insurance purchase. These organizations are often at a loss to provide group travel insurance that fits the cultural, operational or personal demands of all their travelers. People going to Western countries often want higher medical expense limits, while people going to developing countries do not request this. People from certain parts of the world value higher death benefits. Some travelers require trip cancellation and baggage insurance, while others eschew it. Some travelers want to travel just before or after their official program and need to extend their coverage. Organizations can use Core travel insurance to cater to these different constituencies. It satisfies demand, keeps premium costs low, and lowers liability risk associated with buying group travel medical insurance that does not work as the traveler wishes.

It is a benefit of this invention that the Core insurance program is easy for travelers to use and carries no administrative burden for the organization purchasing the Core coverage. The introduction of the website or other e-commerce means as a medium for managing individual upgrades makes the product highly workable for the traveler, the travel organization, and the risk taker. Travel insurance upgrades are, in the present embodiment, accomplished through a website and the website's database. In an alternate embodiment, another e-commerce means may substitute for the website; examples include an FTP site, a USENET site, e-mail, and Web 2.0 functionality. The database may be a commercially available database product or a custom-designed database 165. It is populated through the use of an application wizard program associated with the website 160 or other e-commerce means. The application wizard incorporates questions that are asked of the traveler; the responses are put into a series of fields; the fields may comprise, but are not limited to:

- An individual traveler's name (this is known to the system if the traveler logs in to upgrade his or her coverage)
- The individual traveler's permanent address (this is known to the system if the traveler logs in to upgrade his or her coverage)
- The individual traveler's address while traveling (if known) (this is known to the system if the traveler logs in to upgrade his or her coverage)
- The individual traveler's upgrade coverage options, including upgraded medical coverage, upgraded lost baggage coverage, upgraded extended-trip coverage, coverage for being the driver of an automobile, third party liability, trip delay and expanded travel coverages, and upgraded trip cancellation coverage, upgraded lost baggage coverage, upgraded extended-trip coverage, and upgraded trip cancellation coverage;
- The individual traveler's upgrade coverage price;
- The individual traveler's credit card or other payment information;
- The individual traveler's destination (this is known to the system if the traveler logs in to upgrade his or her coverage);
- The individual traveler's country of origin (this is known to the system if the traveler logs in to upgrade his or her coverage); and
- The individual traveler's travel dates (this is known to the system if the traveler logs in to upgrade his or her coverage).

In the present embodiment of the invention, the traveler must log in to the system to upgrade his or her coverages. However, it is within the scope of the invention that the traveler may be able to upgrade his or her insurance coverages merely with an identifier such as social security number, driver's license number, organization-issued identification number, or other unique identifier. There may also be electronic means by which traveler's information may be automatically downloaded to the carrier by groups or website 160*s* using electronic systems such as API. The traveler may be required to enter a pair of identifiers, such as social security number and zip code for example; other identifier pairs are also within the scope of the invention. This identifier may or may not provide access to the traveler's complete profile, but the identifier does link to the profile such that additional coverage is assigned to that traveler when additional coverage is purchased.

It is also within the scope of the invention for the traveler to upgrade his or her insurance by communicating his or her wishes via letter, email, fax, or voice to an agent or employee of the risk-taker or travel company. In this case, the agent or employee inputs the traveler's information, accepts payment, and issues the upgrade or upgrades. The agent or employee then sends a communication using email, fax, downloadable written communication, or hard-copy (postal) delivery, or any combination, to the traveler confirming and binding the coverages. The communication contains the name of the insured person, the coverages extended, improved, or added, a contact telephone number and email address, the name of the risk taker, the policy number, travel assistance information, and a limitations statement.

The hierarchy for access to change information in the database is shown in Table 1.

| Function | Access to Changing Information |
|---|---|
| Database Administrator | Access and change every part of the database |
| Travel Organization | Access to and changing permission for information related only to their own group |
| Organizations supplying service to the insurance product | Read-only access to the entire database 165 |
| Individual traveler | Access to and changing permission for only his or her own information |

The system is fully automated, available fully to all users (including the risk taker, claim administrator, assistance company, Core travel e-commerce means administrator, and Core program manager) and can handle the insurance products as soon as the specifications are inserted for the upgrade products and the enrollments are downloaded onto the database.

The program can provide coverage for travelers going from the US to any country covered by the carrier's traveler's insurance; it can also provide coverage for travelers traveling from any non-US country to the US or any other country, depending on the limitations of the carrier's traveler's insurance. The program can also provide coverage for travelers whose itinerary does not include any stop in the United States, depending on the limitations of the risk taker's travel insurance.

A benefit of an upgrade package such as is described herein is that the individual traveler's upgrades are negotiated on group terms.

While a preferred embodiment is shown and described herein, it should be understood that the present disclosure is made by way of example only and that variations in the described method and its uses are possible within the scope of this disclosure without departing from the subject matter coming within the scope of claims to be examined, and a reasonable equivalency thereof, which I regard as my invention.

I claim:

1. A method for modifying group travel insurance comprising:

an international travel organization buying a group insurance program that has the capability to allow individual upgrades that includes coverage for members of the group consisting of travelers who are planning to travel in a group with said organization, said traveler's family members and said traveler's traveling companions wherein said family members and said traveling companions are traveling under the program as is said traveler;

a disseminator chosen from the group whose members consist of said international travel organization, a program manager, a broker, a program administrator, an insurance broker, and a risk taker disseminating information about said group insurance program purchased by said organization to said travelers;

said group insurance program adding an individual insurance component to said group insurance plan while allowing travelers to use both group and individual insurance products;

said disseminator providing information to said travelers regarding the availability of the individual choice option to said travelers and referring said travelers to an e-commerce means provided by a member of the group consisting of said risk taker and said international travel organization;

said travelers then visiting said website and making voluntary upgrade choices using said website's functionality;

said travelers paying premiums for said coverage by choosing a member of the group consisting of utilizing a commercially available online payment mechanism provided by said website and mailing payment to a designated payee;

said coverage not being upgraded until said traveler's purchase of upgraded coverage is confirmed;

said coverage being upgraded before said premium is received; and said travelers then receiving a communication of a type chosen from the group consisting of email, SMS text message, paper letter, downloaded confirmation communication, and fax, from a member of the group consisting of said website, said program manager, and said administrator, wherein said communication confirms and binds said individual upgrades of coverage.

2. The travel insurance modification method of claim 1 further comprising said e-commerce means comprising a website, an FTP site, a USENET site, email, and Web 2.0.

3. The travel insurance modification method of claim 2 further comprising said e-commerce means comprising a front end and a back end.

4. The travel insurance modification method of claim 3 further comprising said back end being driven by a database, said database being chosen from the group consisting of a commercially available database and a custom-designed database.

5. The travel insurance modification method of claim 4 further comprising said database comprising a set of fields, said set of fields comprising:

an individual traveler's name;

said traveler's permanent address;

said traveler's address while traveling;

said traveler's upgrade coverage options, said options being selected from the group consisting of upgraded medical coverage, lost baggage coverage, extended-trip coverage, coverage for being the driver of an automobile, third party liability, trip delay and expanded travel coverages, and upgraded trip cancellation coverage;

said traveler's upgrade coverage price;

said traveler's credit card or other payment information;

said traveler's destination;

said traveler's country of origin; and said traveler's travel dates.

6. The travel insurance modification method of claim 1 further comprising said insurance being available to travelers with trips originating within a group consisting of inside the U.S. and outside the U.S.

7. The travel insurance modification method of claim 1 further comprising said insurance being available to travelers regardless of whether the traveler passes through the U.S. during their trip.

8. The travel insurance modification method of claim 3 further comprising said database being accessible to all administrators of the database, the insurance program manager, the travel organization, and to the individual traveler, at various levels of access as follows:

a. Database administrators can access and change every part of the database;

b. Travel organizations can access and change only their own information;

c. Organizations that supply service to the insurance product have read-only access to the entire database; and d. Individual travelers can access and change only their own information.

9. The travel insurance modification method of claim 1 further comprising insurance modifications being bound with a written communication from the risk taker or travel company to the traveler, said written communication containing the name of the insured person, the coverages extended, improved or added, a contact telephone number and email address, the name of the risk taker, the policy number, travel assistance information and a limitations statement.

10. The travel insurance modification method of claim 9 further comprising said written communication being a member selected from the group consisting of email, fax, downloaded confirmation communication, and hard-copy letter.

11. The travel insurance modification method of claim 1 further comprising said customizable upgrade options being available for said traveler and for family members and traveling companions of said traveler.

12. The travel insurance modification method for group travel insurance of claim 1 further comprising a plan type selected from the members of the group consisting of self-insurance plan, high-retention plan, and captive plan.

13. The travel insurance modification method of claim 1 further comprising coverage for the group consisting of individual travelers, said traveler's family members, and said traveler's traveling companions, wherein said traveling companions are selected from the group whose members consist of the traveler's children and the traveler's wards.

14. The travel insurance modification method of claim 3 further comprising said database being updated by a member of the group consisting of said international travel organization, said administrator, said program manager, and an API.

* * * * *